US012755408B2

(12) United States Patent
Murhed

(10) Patent No.: US 12,755,408 B2
(45) Date of Patent: Oct. 6, 2026

(54) IMAGING SYSTEM AND METHOD REGARDING THREE DIMENSIONAL IMAGING BASED ON LIGHT TRIANGULATION

(71) Applicant: SICK IVP AB, Linköping (SE)

(72) Inventor: Anders Murhed, Linköping (SE)

(73) Assignee: SICK IVP AB, Linköping (SE)

( * ) Notice: Subject to any disclaimer, the term of this patent is extended or adjusted under 35 U.S.C. 154(b) by 0 days.

(21) Appl. No.: 18/664,716

(22) Filed: May 15, 2024

(65) Prior Publication Data

US 2025/0061595 A1 Feb. 20, 2025

(30) Foreign Application Priority Data

Jul. 6, 2023 (EP) .................................... 23184017

(51) Int. Cl.

*G06T 7/521* (2017.01)
*G06T 5/80* (2024.01)
*G06T 7/73* (2017.01)

(52) U.S. Cl.

CPC ................ *G06T 7/521* (2017.01); *G06T 5/80* (2024.01); *G06T 7/73* (2017.01)

(58) Field of Classification Search

CPC .............. G06T 7/521; G06T 5/80; G06T 7/73
USPC ........................................................ 348/136
See application file for complete search history.

(56) References Cited

U.S. PATENT DOCUMENTS

| | | | |
|---|---|---|---|
| 2002/0014577 | A1 | 2/2002 | Ulrich |
| 2018/0180738 | A1 | 6/2018 | Alexandrov |

FOREIGN PATENT DOCUMENTS

| | | |
|---|---|---|
| CN | 109460024 | 3/2019 |
| JP | H0481007 | 3/1992 |
| JP | H07107346 | 4/1995 |
| JP | H07198620 | 8/1995 |
| JP | H10132559 | 5/1998 |
| JP | 2011002416 | 1/2011 |
| JP | 2021025911 | 2/2021 |

*Primary Examiner* — Justin W Rider

(74) *Attorney, Agent, or Firm* — DUANE MORRIS LLP; Gregory M. Lefkowitz; Daniel J. Tarr

(57) ABSTRACT

Imaging system for three dimensional imaging based on light triangulation and method for supporting reduction of distortions in three dimensional imaging based on light triangulation. The imaging system comprises a camera and a light source configured to provide an illumination of the object comprising structured light. The structured light intersecting a virtual volume comprising the object and that corresponds to a volume where one or more objects, including said object, that the imaging system is configured to image are present during the imaging. At least during said imaging by the camera it is prevented stray light from the light source to reach the virtual volume within field of view of the camera. In the imaging system this is accomplished by a light shield arranged outside the structured light between the light source and said virtual volume.

13 Claims, 9 Drawing Sheets

IMAGING SYSTEM AND METHOD REGARDING THREE DIMENSIONAL IMAGING BASED ON LIGHT TRIANGULATION

TECHNICAL FIELD

Embodiments herein concern an imaging system for three dimensional imaging based on light triangulation.

BACKGROUND

Industrial vision cameras and systems for factory and logistic automation may be based on three-dimensional (3D) machine vision, where 3D-images of a scene and/or object are captured. By 3D-images it is referred to images that comprise also "height", or "depth", information and not, or at least not only, information, such as intensity and/or color, regarding pixels in only two-dimensions (2D) as in a conventional image. That is, each pixel of the image may comprise information associated with the position of the pixel and that maps to a position of what has been imaged, e.g. the object. Processing may then be applied to extract information on characteristics of the object from the 3D images, i.e. 3D-characteristics of the object, and for example convert to various 3D image formats. Such information on height may be referred to as range data, where range data thus may correspond to data from height measurement of the object being imaged, or in other words from range or distance measurements of the object. Alternatively or additionally the pixel may comprise information on e.g. material properties such as relating to the scattering of the light in the imaged area or the reflection of a specific wavelength of light.

Hence, a pixel value may e.g. relate to intensity of the pixel and/or to range data and/or to material properties.

Line scan image data results when image data of an image is scanned or provided one line at a time, e.g. by camera with a sensor configured to sense and provide image data, one line of pixels at a time. A special case of line scan image is image data provided by light triangulation using a "sheet of light" illuminating an object that is scanned by the light. The sheet of light intersecting with the object result in a light line projected on and reflected by the object. Typically a laser is used, resulting in a laser line on and reflected by the object towards a camera. Laser is often preferred, and the light triangulation is then sometimes referred to as laser triangulation but also other light sources able to provide a "sheet of light", that is, a light plane, or other structured light can be used. That is, light sources able to provide light that stays focused and do not spread out too much, or in other words, light that is "structured", for example light provided by a laser or Light Emitting Diode (LED). Hence, in general, light triangulation as mentioned above is based on using structured light for the illumination.

Structured light corresponds to a defined, typically predefined, pattern of light for illuminating of the object as part of the light triangulation. Often, as indicated above, the structured light in the form of a light plane that when it illuminates the object surface, result in a light line projected on and reflected by the object surface and imaged by the camera. Other examples of structured light include a light edge of illumination provided over a greater area, which can be considered to correspond to a thick light line illuminating the object, where the light edge projected on the object corresponds to and may be used correspondingly as the light line in the light plane case. Also other structured light may be used for illumination of the object in light triangulation, for example that result in lines, dots, grids, bars, etc. projected on and reflected from the object surface.

In any case, the structure of the structured light make it possible to identify real world positions where the reflections on the object surface occurred, for example in the light plane if the structured light corresponds to a light plane, and map these positions on the image sensor, and in the image, where the light, for example reflected light line, is captured. As should be recognized, this is a fundamental principle of light triangulation based 3D imaging.

3D machine vision systems are often based on light triangulation as above. In such a system there is a light source illuminating the object with the structured light, such as a light plane resulting in a light line on the object and along which line 3D characteristics of the object can be captured, corresponding to a profile of the object. By scanning the object with such a line and performing a line scan of the object, which involved movement of the line and/or object, 3D characteristics of the whole object can be captured, corresponding to multiple profiles.

Typically, to produce a 3D-image based on light triangulation, reflected light from an object to be imaged is captured by an image sensor of a camera, for example resulting in imaging of a light line projected on the object. Intensity peaks are then detected in the resulting image data. The peaks occur at positions, in sensor coordinates, corresponding to locations on the object that reflected the structured light captured by the image sensor. With mapping, typically known from a calibration procedure at setup of the imaging system, between real world coordinates where the structured light is provided and image sensor coordinates where the reflected structured light is captured, the image data contain said height information about the object where the reflections occurred. Typically, but not necessary, the imaging system is setup so that intensity peaks relating to reflected light should occur and be expected per column of the sensor and the position within the column maps to height.

It is realized from the above that other intensity peaks in the image data than intensity peaks resulting from the light triangulation as such can cause problems and should, if they occur, at least not be detected and/or used as intensity peaks belonging to the light triangulation as such. Also, too strong intensity peaks that saturate image sensor pixels can cause problems and make it difficult to detect a peak with desirable resolution. A result from unwanted intensity peaks as mentioned above may be artefacts in the resulting profile image and also in a resulting complete 3D image formed from multiple profile images, for example artefact in the form of "spikes" in the 3D image.

The unwanted intensity peaks can for example be caused by secondary reflections and/or very strong specular reflections by the structured light and they are in the prior art typically mitigated by solutions "post image sensing", that is, by processing the resulting image data, for example before or as part of an intensity peak detection algorithm, The challenge is to find and/or identify only the "wanted" intensity peaks for the light triangulation, resulting from direct reflections on the object surface by the structured light and/or remove or avoid using the unwanted intensity peaks for the light triangulation, such as intensity peaks caused by secondary reflections by the structured light. It is realized that if an unwanted intensity peak is used as a wanted one, that is, "as if it was the wanted one for the light triangulation" cannot result in a correct 3D imaging of the object.

Since the structured light as such is wanted and used by the light triangulation, it is natural to focus on "post image sensing" solutions to identify the wanted intensity peaks. False reflections often cause said type of distortions in the form of "spikes", that is, extremely narrow peaks in the 3D image, therefore is median filtering, or similar, often used in the prior art to reduce problems with spikes "post image sensing".

Another, "pre image sensing", prior art solution is directed to reduce problems from specular reflections of structured light by using polarized light. This reduces specular reflections while it still can provide usable diffuse reflections for the light triangulation, see for example. A drawback with this is that polarizing filter to accomplish the polarized light cause removal of a great amount of the generated light and energy efficiency goes down.

Despite existing solutions as above that are directed to mitigate negative effect from specular reflections during 3D imaging based on light triangulation, there are still problems with distortion, such as said "spikes", particularly when the objects being imaged have highly reflective surfaces.

SUMMARY

In view of the above, an object is to provide one or more improvements or alternatives to the prior art, such as facilitating removal and/or reduction of distortions, such as "spikes", in 3D images from a 3D imaging system based on light triangulation.

According to a first aspect of embodiments herein, the object is achieved by an imaging system for three dimensional imaging of an object based on light triangulation. The system comprises a camera and a light source configured to provide illumination of the object comprising structured light. The camera is arranged in relation to the provided structured light so that the camera is able to capture reflected structured light (511) from the object in an image as part of said light triangulation whereby, according to the light triangulation, positions of captured reflected structured light in the image map to real world positions where the structured light was reflected by the object. The structured light intersecting a virtual volume comprising the object and that corresponds to a volume where one or more objects, including said object, that the imaging system is configured to image are present during the imaging. The imaging system further comprises a light shield arranged arranged outside the structured light between the light source and said virtual volume such that light shield shields stray light from the light source and thereby prevents it from reaching the virtual volume within field of view of the camera.

In some embodiments, the light shield has one or more light shielding major surfaces that have extension in one or more directions orthogonal to an illumination direction of the structured light.

In some embodiments, the light shield extends outside the structured light between the light source and the virtual volume with a distance to the structured light that decreases in direction of the virtual volume.

In some embodiments, the light shield is arranged outside the structured light with distance to the structured light such that the light shield thereby avoids shielding light of the illumination closer to the structured light than where the illumination has decreased to 5% of its maximum intensity.

In some embodiments, the light shield is arranged outside the structured light with distance to the structured light but so close that the light shield at least shields light of the illumination where the illumination has decreased to 1% of its maximum intensity.

In some embodiments, the light shield comprises:

- a first light shield part arranged on a first side of the structured light in direction of the camera; and/or
- a second light shield part arranged on a second side of the structured light in opposite direction of the camera.

In some embodiments, the first light shield part is arranged outside at least a part of field of view of the camera that is covering the structured light in the virtual volume.

In some embodiments, the light shield is closest to the structured light where the light shield is closest to the virtual volume and/or where the light shield is closest to where the illumination has a focus point.

According to a second aspect of embodiments herein, the object is achieved by a method for supporting reduction of distortions in three dimensional imaging based on light triangulation, where said three dimensional imaging is performed by an imaging system. The imaging system comprising a camera and a light source for providing illumination of an object to be imaged. Said illumination comprising structured light used in the light triangulation. The camera being arranged in relation to the provided structured light so that the camera during the imaging captures reflected structured light from the object in an image as part of said light triangulation whereby, according to the light triangulation, positions of captured reflected structured light in the image map to real world positions where the structured light was reflected by the object. The structured light intersecting a virtual volume comprising the object and that corresponds to a volume where one or more objects, including said object, that the imaging system is configured to image are present during the imaging. The method comprise to, at least during said imaging by the camera, prevent stray light from the light source to reach the virtual volume within field of view of the camera.

In some embodiments, said prevention of stray light is accomplished by shielding the stray light by a light shield arranged outside the structured light between the light source and said virtual volume. The light shield may be as described above.

Embodiments herein are based on that it has been found that reflections by stray light, although very weak and seemingly and typically negligible in relation to the structured light used in the light triangulation, nevertheless can be problematic when the stray light cause specular reflections in field of view of the camera within the virtual volume, for example reflections on the object being imaged but outside the structured light or on an adjacent object in the virtual volume, such as an object to be imaged next or that has been imaged just before the object being imaged. Even though the stray light as such is very weak in relation to the reflected structured light from the object towards the camera, said specular reflections of stray light, mainly direct reflections but sometimes also secondary specular reflections, towards the camera have been found to cause unwanted intensity peaks that are difficult to discriminate from wanted intensity peaks according to the light triangulation and caused by said structured light. Post-imaging methods for finding wanted intensity peaks for the light triangulation, that is, corresponding to direct reflections from the object, typically focus on excluding other unwanted intensity peaks than from specular stray light reflections, such as from secondary reflections of said structured light or caused by other phenomenon. By, as in embodiments herein, preventing stray light from entering in field of view within the virtual volume, for example by shielding the stray light, will reduce the risk of problematic specular stray light reflections to occur, that else for example result in distortions, such as "spikes", in the 3D image. Hence, embodiments herein enable, or at least support, reduction of this and thereby also improved 3D imaging.

BRIEF DESCRIPTION OF THE DRAWINGS

Examples of embodiments herein are described in more detail with reference to the appended schematic drawings, which are briefly described in the following.

FIG. 1 schematically illustrates an example of a prior art imaging system for 3D imaging based on light triangulation that embodiments herein may be based on.

DETAILED DESCRIPTION

Figure 1:
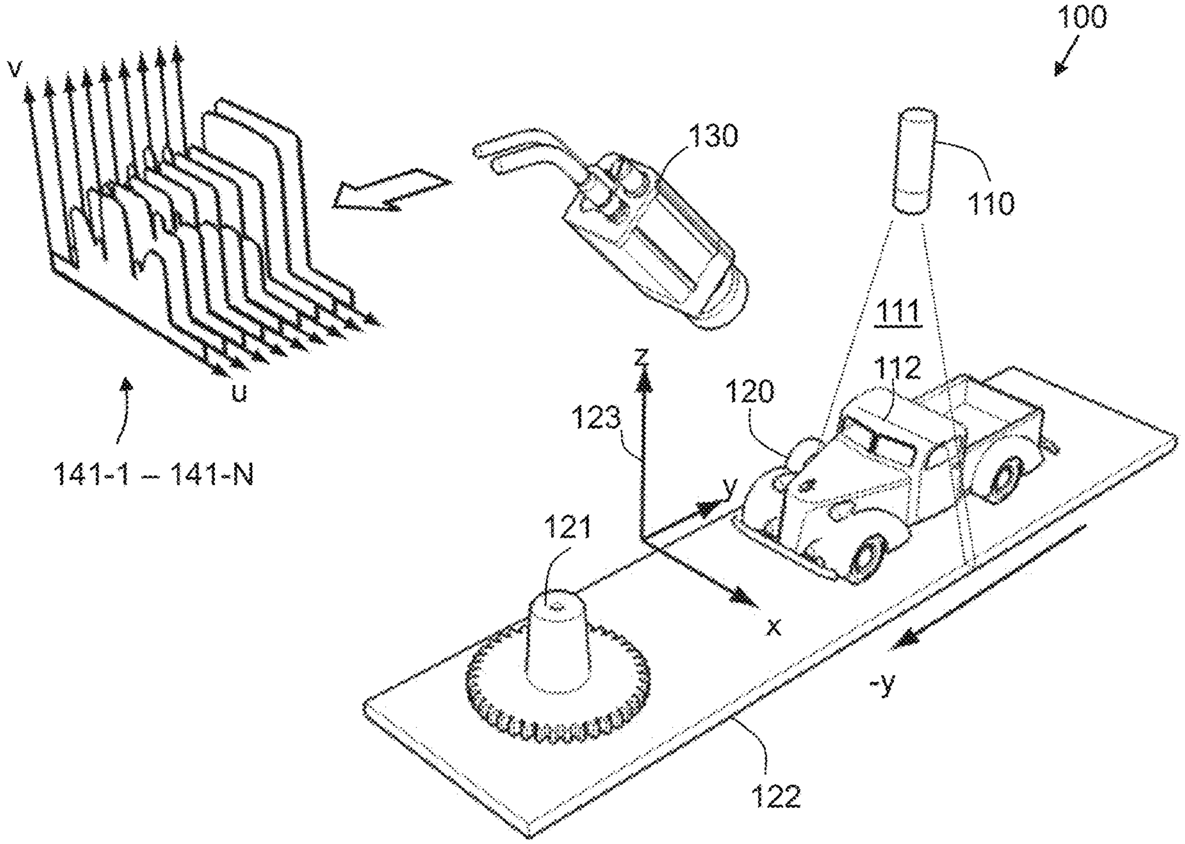
FIG. 1 (PRIOR ART)

Embodiments herein are exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

As a part of the development towards embodiments herein, the situation discussed in the Background will first be further elaborated upon and discussed.

Even though a major part of the light from the light source is the structured light used in and by the light triangulation, it is in practice typically impossible to totally avoid that the illumination by the light source also results in some stray light outside of the structured light. The total stray light is, in principle by definition, very small compared to the structured slight and appear, and is often also, negligible in comparison. Stray light normally causes no problem in case of object surfaces that only provide diffuse reflections.

Since the total amount of stray light compared to the structured light used in light triangulation is so very small and appear prima face insignificant, stray light is conventionally ignored in the context of light triangulation. As discussed in the Background, problems with specular reflections have been attributed to, and is also resulting from, the structured light and there exist different solutions to this.

In addition to that that the stray light appears prima facie and often is insignificant in relation to the structured light, the following may explain that the problem with stray light in light triangulation is not, or at least not well, recognized in the prior art despite that 3D imaging by light triangulation has been around for a long time: Such "post image sensing" solutions mentioned in the Background and that operate on the image data solve at least some problems also with unwanted intensity peaks caused by stray light. Any stray light induced intensity peak will typically mix with other unwanted intensity peaks, such as caused by secondary structured light reflections. Stray light reflections are in principle only a problem when the object or objects being 3D imaged based on the light triangulation have highly reflective surfaces and in that case unwanted intensity peaks caused by secondary and higher order reflections of the structured light also increase.

Embodiments herein are based on the finding and realization that stray light, even if the total amount of amount of it appear insignificant in relation to the structured light, still may cause problematic unwanted intensity peaks in the image data, some which may be particularly difficult to get rid of by said "post image sensing" methods operating on the image data for finding the wanted intensity peaks for the light triangulation. Hence, embodiments herein are further based on realization that it is possible to improve 3D imaging based on light triangulation if stray light could be prevented to cause reflections that result in unwanted intensity peaks in the first place. This way there will be less unwanted intensity peaks in the image data to be dealt with, for example by conventional or other "post image sensing" methods.

Before discussing and explaining embodiments herein in further detail, some basics about prior art 3D imaging systems based on light triangulation, and such systems in general, will be discussed as well as detailed examples of situations where stray light may cause problems as mentioned above. This is done in order to facilitate understanding of embodiments herein and differences compared to prior art and conventional 3D imaging system based on light triangulation.

FIG. 1 schematically illustrates an example of a prior art imaging system 100 for 3D imaging based on light triangulation that embodiments herein may be based on. The imaging system 100 may alternatively, for example, be named an imaging system for 3D machine vision based on light triangulation for capturing information on 3D characteristics of target objects. The imaging system 100 is in the figure shown in a situation of normal operation, that is, typically after calibration has been performed and the system is thus calibrated. The imaging system 100 is configured to perform light triangulation, here in the form of sheet of light triangulation, that is, light triangulation where the structured light being a light plane is used. The imaging system 100 further comprises a light source 110, such as a laser, for illumination of objects to be imaged with structured light, typically a specific light pattern. In the example and figure there is structured light 111 in the form of a light plane. The light may, but not need to be, laser light, it may alternatively for example be light from one or m more Light Emitting Diodes (LEDs). Another example of structured light that is similar to but not what conventionally is a light plane but with similar effect, is a light edge, that is, an edge of an area with illumination. The generated light and illumination is typically provided through one more lenses, for example in order to focus the light. Moreover, the camera is typically configured and located so that it, based on the so called Scheimpflug principle, will have a focus plane co-located with, in other words, aligned, with the structured light 111, typically light plane. This way object reflections that occur in the light plane will be in focus in the image sensor. In the shown example, the objects subject to the imaging are exemplified by a first object 120 in the form of a car and a second object 121 in the form of a gear wheel construction. The objects that are imaged may be referred to as measure objects. When the structured light 111 is incident on an object, this corresponds to a projection of the structured light 111 on the object, which may be viewed upon as the structured light 111 intersects the object. For example, in the shown example, the structured light 111 in the form of the light plane results in a light line 112 on the first measure object 120. The structured light 111 is reflected by the object, more specifically by portions of the object at the intersection, that is, at the light line 112 in the shown example. The imaging system 100 further comprises a camera 130 comprising an image sensor (not shown in FIG. 1). The camera and image sensor are arranged in relation to the light source 110 and the objects to be imaged so that the structured light 111, when reflected by the objects, become incident on the image sensor. The image sensor is an arrangement, typically implemented as a chip, for converting incident light to image data. Said portions of the object, which by reflection causes said incident light on the image sensor, may thereby be captured by the camera 130 and the image sensor, and corresponding image data may be produced and provided for further use. For example, in the shown example, the structured light 111 will, at the light line 112 on a portion of the car roof of the first object 120, be reflected towards the camera 130 and image sensor, which thereby may produce and provide image data with information about said portion of the car roof. In accordance with the principle of light triangulation, with knowledge of the geometry of the imaging system 100, for example how image sensor coordinates relate to world coordinates, such as coordinates of a coordinate system 123, such as Cartesian coordinates, relevant for the object being imaged, the image data may be converted to information on 3D characteristics, for example in the form of a 3D shape or profile, of the object being imaged in a suitable format. The information on said 3D characteristics may comprise data describing 3D characteristics in any suitable format.

By moving the light source 110 and/or the object to be imaged, such as the first object 120 or the second object 121, so that multiple portions of the object are illuminated and cause reflected light sensed in images by the image sensor, in practice typically by scanning the objects with the structured light 111, image data describing a more complete 3D shape of respective object may be produced, for example corresponding to multiple, consecutive, profiles of respective object, such as the shown profile images 140-1-140-N of the first object 120. Each profile image shows a contour of the first object 120 where the structured light 111 was reflected when the image sensor of the camera unit 130 sensed the light resulting in the profile image. As indicated in the figure, a movable object support structure 122, such as a conveyor belt or similar, may be used to move, and thereby scan, objects through the structured light 111, with the light source 110 and the camera unit 130 typically stationary. Alternatively the structured light 111 may be moved over the object so that all portions of the object, or at least all portions facing the light source 110, are illuminated and the camera receives light reflected from all parts of the object desirable to image.

As understood from the above, respective image, or image frame, provided by the camera 130 and its image sensor, for example during imaging of the first object 120, may correspond to, or be used to provide, any one of the profile images 140-1-140-N. Each position of the contour of the first object shown in any of the profile images 140-1-140-N are typically determined based on identification of intensity peaks in image data captured by the image sensor and on finding the positions of these intensity peaks. The imaging system 100 and conventional peak finding algorithms are typically configured to, in each image frame, search for an intensity peak per pixel column. If sensor coordinates are u, v and for example u, as indicted in the figure, corresponds to pixel positions along rows in the image sensor and v corresponds to pixel positions along columns, there is for each position u of an image frame searched for peak position along v and the identified peaks in an image frame may result in one such "clean" profile image as shown in the figure, and the total of image frames and profile images can be used to create a 3D image of the first object 120.

Figure 2A:
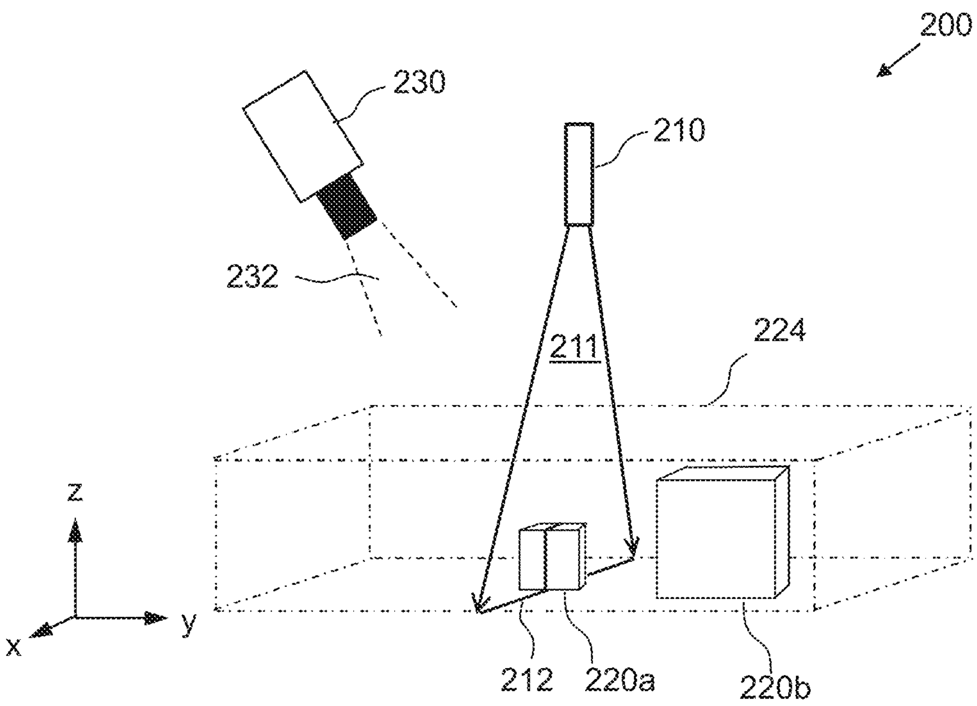
FIG. 2A (PRIOR ART)
FIGS. 2A-B schematically illustrates a situation and some relations present for prior art imaging systems as in FIG. 1.
Figure 2B:
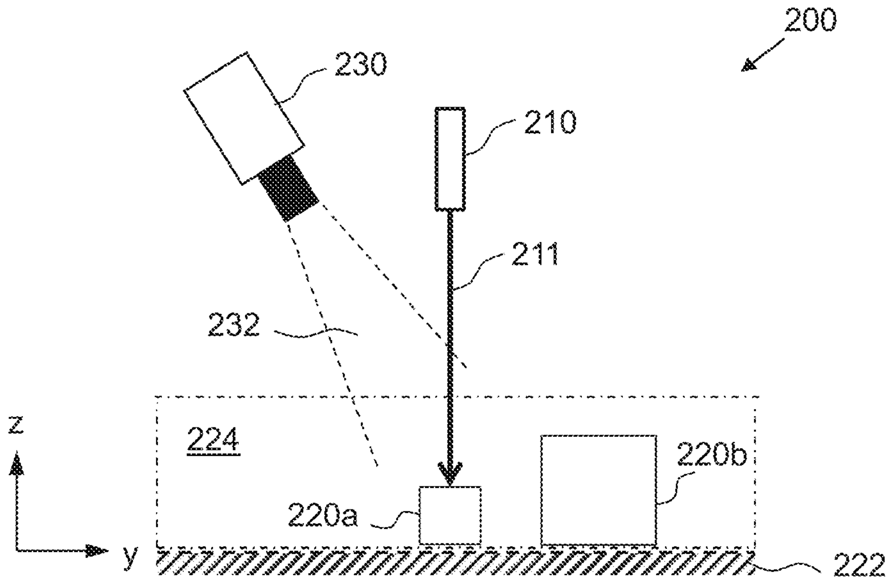
FIG. 2B (PRIOR ART)

FIGS. 2A-B schematically illustrates a situation and some relations present for prior art imaging systems as in FIG. 1, where FIG. 2A is a 3D view and FIG. 2B is a 2D side view of what is shown in FIG. 2A. The shown system may correspond to the imaging system 100 but is shown in an even more schematic and simple view and to draw attention to and explain some particulars associated with such system. Details shown in the figure are to facilitate understanding of and for later comparison with embodiments herein presented further below. The shown imaging system 200 can be considered to correspond to a basic configuration and comprises: A first light source 210 for illuminating an object 220 with structured light 211 as part of light triangulation for 3D imaging of the object 220. The structured light 211 is also here provided in the form of a light plane and may correspond to the structured light 111. A camera 230 with image sensor 231 arranged for sensing reflected first light from the object 220 as part of said light triangulation for the 3D imaging, that is, configured and positioned in relation to each other for the light triangulation. This typically involves that the first light source 210 and the camera 230 are arranged at predetermined fixed positions and with known relations to each other for the light triangulation. The camera 220 has a field of view 232 covering the light plane at least partly, particularly a portion thereof where the object 220, and other objects the system is configured to image, may intersect the light plane.

In a system as in the figure, and also in prior art imaging system in general for 3D imaging based on light triangulation, such as shown in FIG. 1, there is a virtual volume, in FIGS. 2A-B schematically exemplified and explicitly indicated by dashed lines in the figure as a virtual volume 224. As used herein, virtual volume, such as the virtual volume 224, corresponds to a volume where one or more objects, for example objects 220*a-b* shown in the figure, that the imaging system 200 is configured to image, are present during the imaging. The virtual volume comprises where the structured light is present for illumination of, and thus intersecting, an object during the imaging. Further, the virtual volume extends on both sides of the structured light, both towards and away from the camera. The structured light 111 thus provided so it intersects the virtual volume, as shown in the figure. In the figure the structured light 111 is shown in a situation where it intersects the virtual volume 224 and the object 220*a*, resulting in that a light line 212 is projected on the object 220*a* and on an object support structure 222 at the "bottom" of the virtual volume 224, for example corresponding to a surface of the conveyor belt in the example of FIG. 1. A maximum object height supported by an imaging system typically determines the height of the virtual volume and thus where the structured light first reaches the virtual volume.

In the figures there are also shown exemplifying real world cartesian coordinate systems, xyz and xy, for reference.

FIGS. 3A-3D schematically illustrate examples and situations for prior art imaging systems that have been identified to result in problems due to stray light. The shown imaging system 300 may thus correspond to any one of the imaging systems 100, 200 but with objects to be imaged having specular, mirror-like, spherical surfaces, which are very difficult kind of objects to 3D imaging using light triangulation. The objects are schematically illustrated as a first object 320-1 and a second object 320-2 in the figures. The figures and examples in the following are for explaining and showing how also stray light, although weak, can cause problems in these and similar situations.

Since, as mentioned, the imaging system 300 may correspond to any one of the imaging systems 100, 200, there is correspondingly a camera 330 with field of view 332 and light source 310 that may correspond to the cameras 130, 230, field of views 132, 232 and light sources 110, 310. The light source 210 provides illumination that comprises structured light 311 in the form of a light plane and that may correspond to the structured light 111, 211. There is also an object support structure 322 that may correspond do the object support structure 122 or 222. Also a virtual volume 324 is indicated, that may correspond to the virtual volume 224.

Figure 3A:
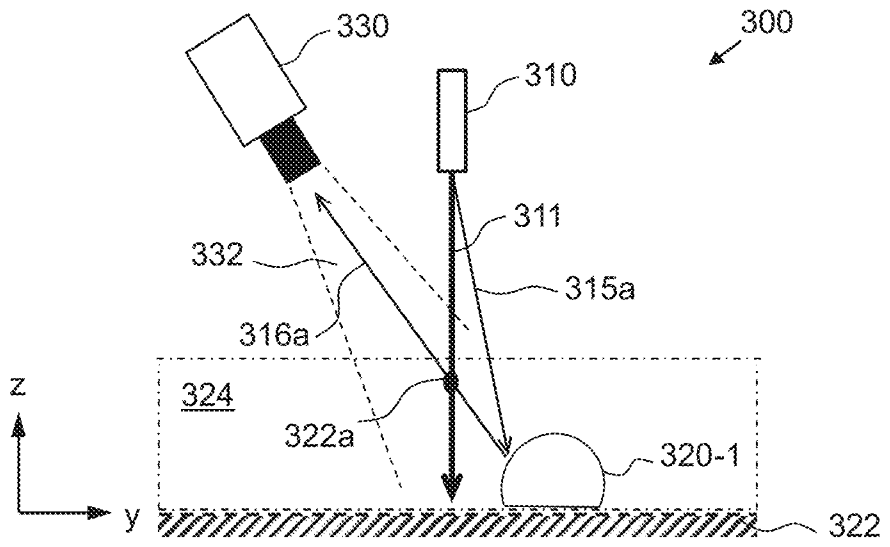
FIGS. 3A-3D schematically illustrate examples and situations for prior art imaging systems that may result in problems due to stray light.

FIG. 3A shows a first exemplary situation with the first object 320-1 outside the structured light 311, for example due to that it not yet has reach it. According to the light triangulation this should not result in any object related intensity peaks at all in an image taken in the shown situation. If any, intensity peaks should only be from diffuse reflections in the object support structure 322. However, although very weak in relation to the structured light 311, stray light 315*a* from the illumination by the light source 310, thus outside the structured light 311 as such used for the purpose of the light triangulation, may, as schematically shown in the figure, reach and cause a specular reflection in the surface of the first object 320-1 with reflected stray light 316*a* towards and imaged by the camera 330. This will manifest in the image as an intensity peak as if there would have been a diffuse reflection by the structured light 311 on an object in a point 322*a* indicated in the figure. Hence, there will be an unwanted intensity peak in the image that may not be so strong as it may be if caused by secondary or higher order of reflections by the structured light 311, but that still may be strong or stronger as intensity peaks from wanted diffuse reflections of the structured light 311. As a result it is difficult to discriminate the unwanted intensity peak in this case from a wanted intensity peak, for example by using conventional post imaging processing for finding wanted intensity peaks.

Figure 3B:
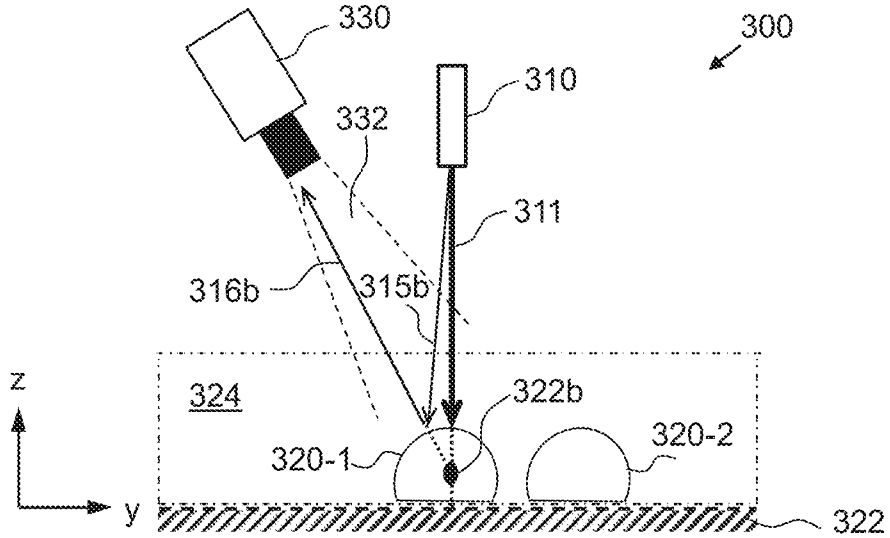

FIG. 3B shows a second exemplary situation with the first object 320-1 illuminated by the structured light 311. The first object 320-1 may have moved to this position from the position in the situation shown in FIG. 3A as part of object scanning. According to the light triangulation this should result in a wanted intensity peak caused by reflection of the structured light in the surface of the first object 320-1. However, also stray light 315*b* from the illumination by the light source 310, thus outside the structured 311 as such used for the purpose of the light triangulation, may, as schematically shown in the figure, reach and cause a specular reflection in the surface of the first object 320-1 with reflected stray light 316*b* towards and imaged by the camera 330. This will manifest in the image as an intensity peak as if there would have been a diffuse reflection by the structured light 311 in an object surface in a point 322*b* indicated in the figure. Hence, there will be an unwanted intensity peak in the image that may be as strong or stronger as wanted diffuse reflections of the structured light 311 on the object. As a result, for example if the first object 320-1 diffusely reflect the structured light 311 towards the camera, there will be at least two intensity peaks where only a single, wanted, one is expected and that are difficult to discriminate from each other, for example by conventional post imaging processing for finding wanted intensity peaks.

Figure 3C:
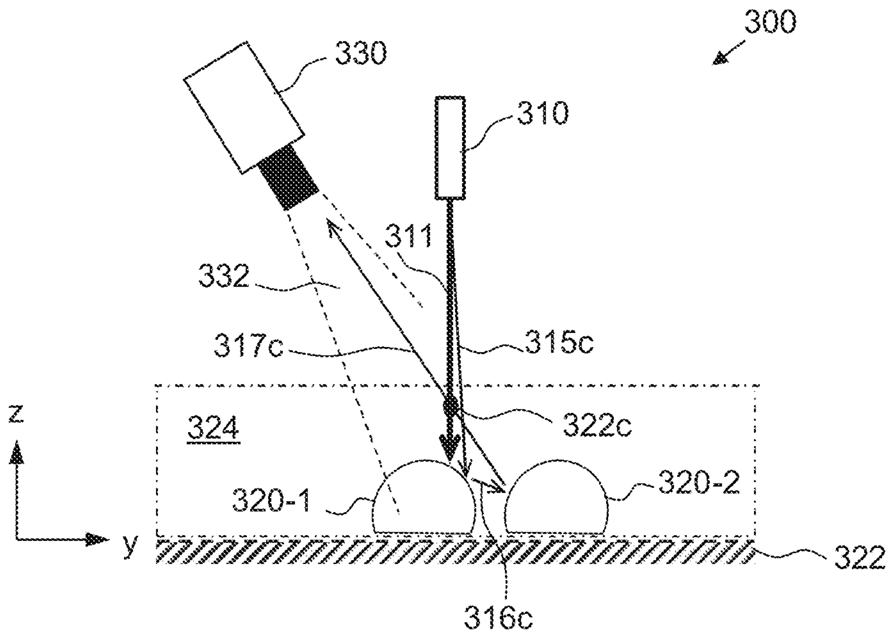

FIG. 3C shows a third exemplary situation with the first object 320-1 illuminated by the structured light 311, where the first object may have moved further to the left after the situation shown in FIG. 3B. According to the light triangulation there should also here be a wanted intensity peak caused by reflection of the structured light in the surface of the first object 320-1. However, stray light 315*c* from the illumination by the light source 310, thus outside the structured 311 may, as schematically shown in the figure, reach and cause a specular reflection in the surface of the first object 320-1, outside the structured light 311. If this part of the second object, as assumed in the example, is highly reflective, such as mirror like, it may, as illustrated in the figure, cause a specular reflection, in the form of a first reflected stray light 316*c*, towards the second object 320-2. If also the second object 320-2, at least where the first reflected stray light 316*c* is reflected by the second object, is highly reflective as well, there may, as shown in the figure, be a secondary reflected stray light 317*c* towards and imaged by the camera 330. This will manifest in the image as an intensity peak as if there would have been a diffuse reflection by the structured light 311 in an object surface in a point 322*c* indicated in the figure. Hence, there will be an unwanted intensity peak in the image that may be correspondingly strong or stronger as wanted diffuse reflections of the structured light 311. As a result, for example if the first object 320-1 diffusely reflect the structured light 311 towards the camera, there will be at least two intensity peaks where only one wanted one is expected and that are difficult to discriminate from each other, for example by conventional post imaging processing for finding wanted intensity peaks.

Figure 3D:
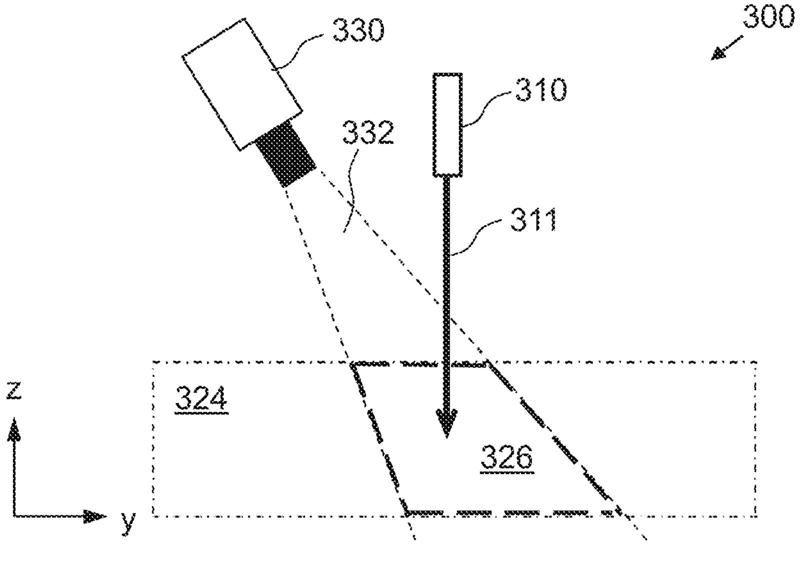

FIG. 3D is for explicitly indicating, by thick dashed lines, a portion, or sub-volume, 326 of the virtual volume 324, where such problematic specular reflections of stray light as discusses above occur. The sub-volume 326 corresponds to the field of view 332 within the virtual volume 324. This is thus where it in particular is desirable to avoid or reduce stray light to enter.

In general for imaging systems based on light triangulation, especially if the objects to be imaged have or are in a vicinity with highly reflective surfaces, it has been found to be advantageous to avoid or reduce entry of stray light, originating from the illumination comprising the structured light, into the camera's field of view within a virtual volume, where the virtual volume corresponds to a volume where one or more objects that the imaging system is configured to image are present during the imaging.

Embodiments herein, as exemplified and described in some derail below, are based on the above finding and insight, where the reduction of stray light into the field of view within the virtual volume is preferably accomplished by shielding stray light and thereby prevent it from entering the into the field of view within the virtual volume.

Figure 4A:
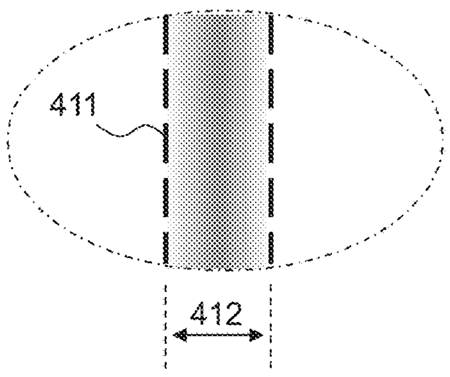
FIGS. 4A-C schematically illustrates how illumination comprising structured light used in light triangulation also comprise stray light and how it may relate to the structured light.
Figure 4B:
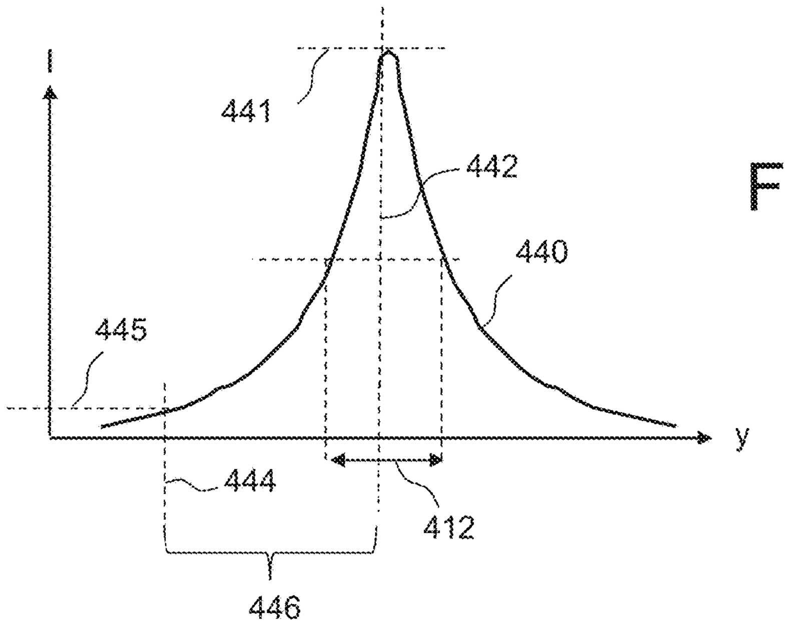
Figure 4C:
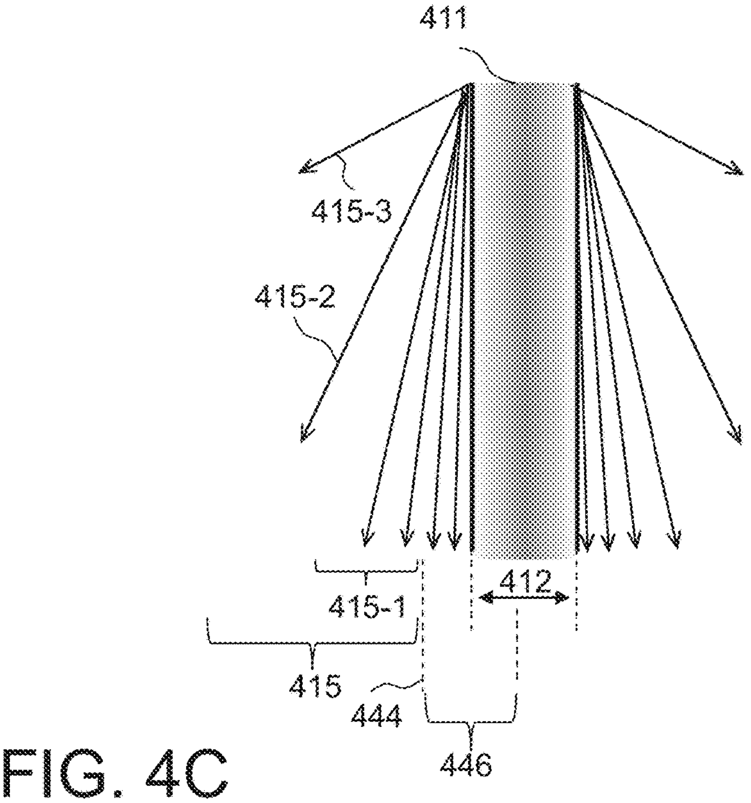

FIGS. 4A-C schematically illustrates how illumination comprising structured light used in light triangulation also comprise stray light and are used in the following to discuss stray light and structured light in relation to each other.

FIG. 4A schematically shows a portion of structured light 411, for example corresponding to the structured light 311 in FIGS. 3A-D, that is, what is shown may correspond to a thickness of a cross-section of a light plane. The figure also attempts to illustrate that the light intensity is not equally distributed, but decreasing in direction away from a maximum intensity of the illumination that of course is part of the structured light 411 and here is in the center of the structured light 411. The structured light 411 is shown as having a thickness 412. However, as realized, there is in practice not a sudden stop with no light at all where the dashed lines are in FIG. 4A, instead there is a continued decrease of light when moving away from the center according to some light distribution that apply, typically Gaussian. The thickness 412 may correspond to some measure used to indicate how thick or thin the light plane is (or resulting line corresponding to projection of the light plane on an orthogonal surface) and/or to specify properties regarding the illumination and light source. A measure that sometimes is used to indicate this is the so called Full Width at Half Maximum (FWHM), that is, the full width of the eight distribution when the maximum, corresponding to peak, intensity, has decreased to half. Also other measures for thickness may be used, but it may for this example be assumed that the thickness indicated in FIG. 4A corresponds to FWHM.

FIG. 4B schematically illustrates how such light distribution mentioned above in connection with FIG. 4A, here a light distribution 440, may look like. The FWHM thickness 412 is indicated in the figure. There is also shown a maximum intensity 441 of the light distribution 440 and a line 442 indicates where the maximum intensity starts to decrease on the left side of the light distribution 440. Further it is shown a location by a line 444 where light intensity of the light distribution 440 has decreased to 5% of the maximum value, indicated by a "5% of max light intensity"-line 445 in the figure. Reason for 5% is discussed explained below. As can be seen in the figure, the line 444 indicates a distance 446 between the lines 442 and 444.

The structured light used in light triangulation comprises at least the maximum intensity of a light distribution and a major part of the illumination, including also light that has decreased below the maximum intensity to a certain degree. For example, the structured light typically comprise light until at least FWHM or according some similar measure. However, a more pragmatic approach is to define the structured light as the light effectively used by and useful for the light triangulation, that may not only be light within for example FWHM. Light distribution typically differs depending on light source, how the light source is configured to provide the illumination etc. It may also differ from application to application what exact part of the light distribution that is used as structured light for the light triangulation (although it is of course always a part comprising the maximum intensity value). Hence exactly where structured light ends is not always the same. However, in practice, for a system setup for a certain light triangulation application, a limit for structured light can be found from simple experimentation: A light shielding element, for example as in embodiments herein and as described below, may be moved towards the structured light, orthogonally to the illumination direction and when there starts to be negative effects on results from the light triangulation and results thereof, and/or when there starts to be visual disturbance of the light, e.g. visual disturbance and/or interference on the light projected on the object or object support surface, the part of the light shielding element closest to the structured light indicates where the structured light that is used in and useful for the light triangulation begins.

Stray light may in the context of light triangulation and as used herein, be defined as light that is not useful for the light triangulation as such and thus be light, part of the illumination, but outside what is considered and used as structured light for the light triangulation, or in other words, stray light is light that is not used in and by the light triangulation as such.

If the structured light and light distribution thereof has a center, for example in case of a light plane with a thickness encompassing the structured light, such in the case of the structured light 412, for example defined according to FWHM, stray light at least refers to light outside this thickness, for example outside the thickness 412, or at a certain distance outside this thickness.

Stray light may be defined or predefined in relation to the light distribution, for example that there should have been a certain decrease of intensity from the maximum intensity, that should be defined so that structured light used for the light triangulation is at least not included. For example, there may be defined a certain distance from a maximum intensity of the light distribution for light to be considered stray light. Preferably such distance is defined in relation to where the light distribution has decreased to a certain degree in relation to its maximum and/or center position, such as decreased to at least x% of the maximum intensity value. It has been found through such experiments as described above that in general, or as a rule of thumb, that structured light used in and useful for light triangulation relevant for embodiments herein is no longer present when the light distribution has decreased to at least 5% of its maximum value and hence that stray light is typically not closer to the maximum intensity than this. This is the reason for the line 444 and the "5% of max light intensity"-line 445 in FIG. 5B.

FIG. 4C is an alternative schematic view to illustrate structured light and stray light at the same time. The structured light 412 is indicated in the figure as well as stray light 415 that here is consider to begin at the line 444, that is, where the light intensity has decreased to 5% of its maximum intensity, which corresponds to the distance 446 from the line 442 inditing where the maximum intensity starts to decrease. As illustrated in the figure, there is, in accordance with the light distribution 440, more light and thus also more stray light closer to the structured light 412 than further away. It can be understood from the figure that the light distribution is not the same at different locations along the illumination, such as at different heights. Note that the thickness 412 comprising structured light 411 in practice also vary in thickness along the illumination although not illustrated in the figure.

Figure 5A:
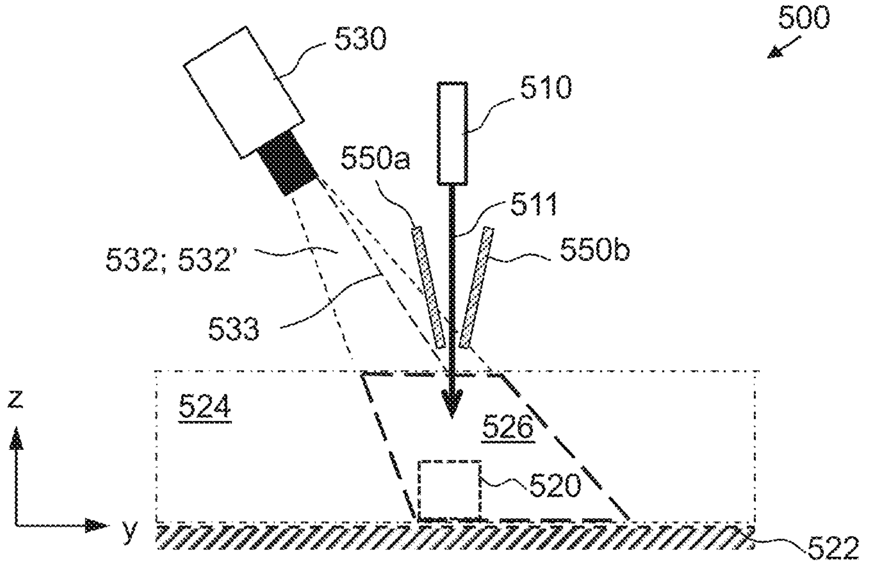
FIGS. 5A-C schematically illustrates an imaging system according to embodiments herein with a first example of a light shield.
Figure 5B:
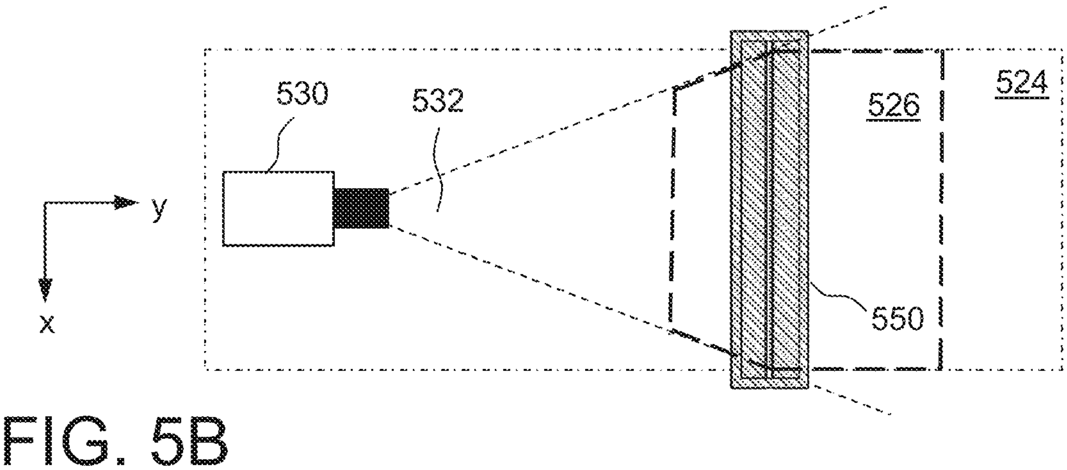
Figure 5C:
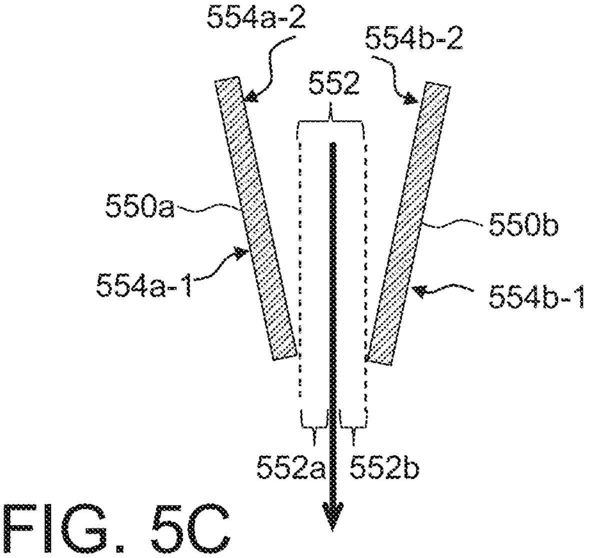

FIGS. 5A-C schematically illustrates an imaging system 500 according to embodiments herein including a first example of a light shield, namely a first light shield 550, for shielding of stray light.

FIG. 5A schematically shows the imaging system 500 in a side view similar as in the example above to facilitate comparison. The side view correspond to a cross section of the light shield 550.

FIG. 5B schematically shows the imaging system 500 from a top view to improve understanding of how it may look like also in the lateral dimension.

The imaging system 500 may correspond to any one of the imaging systems 100, 200, 300, and is thus also a imaging system for 3D imaging based on light triangulation, but with the addition that it also comprises the light shield 550. Hence, the imaging system 500 comprises a camera 530 with field of view 532 and that may correspond to any one of the cameras 130, 230, 330 with field of views 132, 232, 332. There is also a light source 510 that may correspond to any one of the light sources 110, 210, 310 and that provides illumination that comprises structured light 511 in the form of a light plane and that may correspond to any one of the structured light 111, 211, 311. There is also an object support structure 522 that may correspond to any one of the object support structures 122,2 22, 322. Also a virtual volume 524 is indicated, that may correspond to the virtual volume 324 or 224, with a sub-volume 526 indicated that may correspond to the sub-volume 326. The sub-volume 526 corresponds to the field of view 532 within the virtual volume 524. As an example, there is also schematically shown an object 520 to be imaged in the virtual volume 524. The object 520 may correspond to any of the objects to be imaged as shown and discussed in the above examples and drawings, and may for example have one or several surfaces or surface portions that are highly reflective, for example mirror-like, that may cause the kind of problems with stray light discussed above.

The light shield 550 extends between the light source 510 and the virtual volume 524 and comprises a first light shield part 550*a* arranged on a first side of the structured light 511 in direction of the camera 530 and a second light shield part 550*b* arranged on a second side of the structured light 511 in opposite direction of the camera 530. It is advantageous to provide the light shield in at least two parts directed to shield light on respective side of the structured light since this i.a. enables shielding of more stray light.

As can be seen the light shield 550 has a funnel shape due to that the first and second light shield parts 550*a,b* of the light shield 500 extends between the light source 511 and the virtual volume 524 with a distance to the structured light 511 that decreases in the direction of the virtual volume 524. A funnel shape enables efficient and practical stray light shielding with a relatively small total light shield. A relatively small light shielding surface can cover and shield a large part of stray light while it still can ha a smallest distance to the structured light at a single location along the structured light and located where it often is most efficient, such as near the virtual volume.

It is realized from the figure that the light shield 550 has an effect of shielding stray light, that is, at least some stay light, from the light source 510, or in other words stray light of the provided illumination, and that else would reach the sub-volume 526.

As used herein, light shield in general refers to some structure or arrangement, such as the light shield 550 that prevents at least some light incident on the light shield to pass through the light shield and reach an area or volume, such as the sub-volume 526, that else, without the light shield, would be reached by the light that is shielded. Typically all or a major part of light incident on the light shield should be prevented from passing through, or at least all light within certain wavelengths, for example all wavelength of light provided by a light source, such as the light source 511, to accomplish illumination with structured light, such as the structured light 511, for use in 3D imaging by light triangulation as in embodiments herein.

As can be seen in FIG. 5A, the light shield is positioned in the field of view 532 but not so it disturbs the part of the field of view that covers the structured light 511 in the virtual volume 524, that is, so it does not negatively affect imaging of the structured light 511 in the virtual volume 524 since this is where an objects occur during the imaging and reflects the structured light 511 towards the camera 530. In general, a light shield in embodiments herein may obscure part of the field of view and imaging of structured light in the virtual volume but sine this is to the price of a reduced effective field of view, it is normally not desirable. Typically the field of view is provide so its upper limit in FIG. 5A is just covering the max object height that is supported, that is, aligned with height of the virtual volume so it covers the structured light in the virtual volume but nothing or very little of the structured light outside this since no objects to be imaged should occur there and result is therefore reduced utilization of the camera's image sensor for the object imaging. However, in case of a field of view, as the example field of view 532 in the figure, that covers also some structured light outside the virtual volume, it is realized that there is no further penalty for the object imaging if the light shield 532, as shown in the figure, is in the field of view 532 but outside the part of the field of view 532 covering the structured light 511 in the virtual volume 524. In other words, in such case, the light shield 532 should, as shown in FIG. 5A, be outside a virtual line 533 that extends from where the structured light 511 intersects the virtual volume 524 and towards where the field of view begin at the camera 530. The virtual line 533 in a case like this is a limit for and marks an effective field of view 532' for the object imaging and that is reduced compared to the actual field of view 532.

FIG. 5C schematically shows a magnification of the cross section view of the light shield 550 in FIG. 5A. The figure shows a smallest distance 552, corresponding to a gap, for the structured light 511 to pass. In an implementation of a light shield with a corresponding "funnel" design as shown in FIG. 5A-C that was used in tests and experiments, the distance corresponding to the smallest distance 552 was 0.9 mm. In any case, respective light shield part on respective side of the structured light 511 may be arranged with a minimum distance to the structured light based on the discussion above in connection with FIGS. 4A-C, so as to not shield structured light used in the light triangulation. This means for embodiments, as in the FIGS. 5A-C, with two light shield parts, that a first smallest distance 552*a* between the firs light shield part 5501 and the structured light 511, as well as a second smallest distance 552*b* between the second light shield part 550*b*, respectively should be a distance that is sufficient to not shield structured light as well. How this can be accomplished in practice was disclose above in connection with FIGS. 4A-C and for example be determined by the same type of experimentation. That is, if a light shield is so close to the structured light so that that there is visual impact on the structured light, for example visual impact on such as interferences in the projection of the structured light, for example light plane, on the object or object support surface, then the light shield is too close to the structured light and shields and/or affects also structured light to an undesirably degree. With most conventional light sources and structured light, such as light plane, used in light triangulation, this means that the light shield is preferably arranged with a distance to the structured light that is not closer than where the structured light has decreased to at least 5% of its maximum value. Or in other words, where it is at a distance where the illumination comprising the structured light has decreased to at least 5% of its maximum value. That is, the light shield should typically at least not be arranged closer to the structured light than according to this. The light shield may thus only shield stray light at or further away than this distance from the maximum intensity of the structured light. For example, this means that respective smallest distance 552*a*, 552*b* in some embodiments is not closer to the maximum intensity of the structured light 511 than where the intensity of light distribution of the illumination has decreased to 5% of the maximum intensity. However, in some cases it may still be preferred, for reasons also indicated above, with a larger smallest distance, that is, to arrange light shield part(s) even further away from the structured light, for example so it is not closer that than where the intensity of light distribution has decreased to 4%, 3%, 2% or 1% of the maximum intensity.

In applications and cases with a very narrow light distribution, for example provided by a narrow laser, a very small change, such as by accident or by incidental movement of the light shield during operation, may make it shield and negatively affect the structured if it is too close. It may in such situation be preferred to position the light shield with some larger margin to the structured light.

However, in general it may be preferred to have a light shield as close as possible to the structured light used in the light triangulation but without negatively affecting the structured light and thereby the light triangulation as such, that is, so it thereby is negative impact on the object imaging by the light triangulation.

Further, it may be preferred that the smallest distance to the structured light is as close to the virtual volume as possible without affecting the structured light used in the light triangulation and not obscuring and/or disturbing the object imaging. This since it close to the virtual volume may be easier to accomplish an efficient stray light shielding effect.

For placement of light shield and especially where a smallest distance to the structured light may be placed, it should be considered that the light source typically has a lens that the structured light is provided through. The focus point of the lens is often outside, that is, "before or after", the virtual volume in order to ensure that the light distribution is not too narrow in the virtual volume (since some sufficient "width" of the structured light is desirable to utilize to thereby be able to identify peak positions with subpixel resolution). In case the focus point is "before" the virtual volume, it may be beneficial to use a light shield with a smallest distance to the structured light that is at or close to the location of the focus point, since it there is possible to be closer to the structured light without negatively affecting it.

By making sure, for example as above, that the light shield shields at least some stray light that else would reach "union" between the camera's field of view and said virtual volume, that is, reach the field of view within the virtual volume, it is made sure that the light shield will have effect and not only shield stray light that is too far away. However, at the same time that the light shield should not be too close to affect the structured light, as discussed above, it may be beneficial with a small, or at least a not too large, gap between the light shield and the structured light so not too much stray light close to the structured light escape. Hence, the light shield is preferably arranged with a distance from the maximum intensity (peak value) so that it is at least present where the light distribution has decreased to 1% of its maximum value. This in order not to let too much stray light close to the structured light escape the light shield and thereby reduce the effect from embodiments herein.

To sum up, taking the above into account, it has been found that the light shield is preferably arranged with a distance from the maximum intensity (peak value) of the light distribution that is not closer than where the structured light has decreased to at least 5% of its maximum value, and at the same it may be preferred that the light shield is present where the light distribution has decreased to 1% of its maximum value, for example that it is present in and covers at least part of an area extending between 5% and 1%. In many applications this corresponds to that the light shield is present with a gap that is only fractions, or about one or half, a millimeter or a few millimeters up to about a centimeter around the structured light, for example light plane, and/or from the maximum intensity thereof. The light shield, for example light shield part thereof, may extends from there away from the structured light so that the light shield orthogonally to the illumination direction stretches and covers at least some centimeters above the virtual volume, but also longer, or even shorter, may be suitable depending on application.

Further, as realized by the skilled person, such light shields as in embodiments herein and as discussed above, and any part thereof participating in the light shielding, may be made by any one or more of a wide range of different materials. Exactly which material(s) is of less importance as long as it has light shielding properties. However, some opaque plastic material may be preferred to use and/or a coating or cover with surface material on a substrate or core material to accomplish or enhance light shielding properties. For example to make the light shield more light absorbent and/or non-reflective. A matte and preferably dark surface may be preferred to avoid or minimize that reflections from the light shield itself occur. It may, at last in some embodiments be preferred to make sure that one or more surfaces facing the virtual volume, such as surfaces 554*a*-1, 554*b*-1, are non-reflective, such as by making them extra light absorbent and/or make sure these surfaces are matte and/or dark since a reflective such surface n worst case can cause secondary reflections of reflected light coming from the virtual volume and reflect it back to the virtual volume where it can cause unwanted intensity peaks in images. It may matter less if one or more light shield surfaces, such as surface 554*a*-2, 554*b*-2, facing the light source, for example light source 510, cause some reflections since there is still shielding effect and any light reflected on that side is less likely to end up in the sub-volume 526 and cause problems. However, there is of course typically no meaning that such surface is highly reflective and in practice it may be simplest to make all light shielding surfaces of the same material and/or to have the same coating, for example low-reflective and light absorbing, such as matte and preferably of dark color.

Figure 6A:
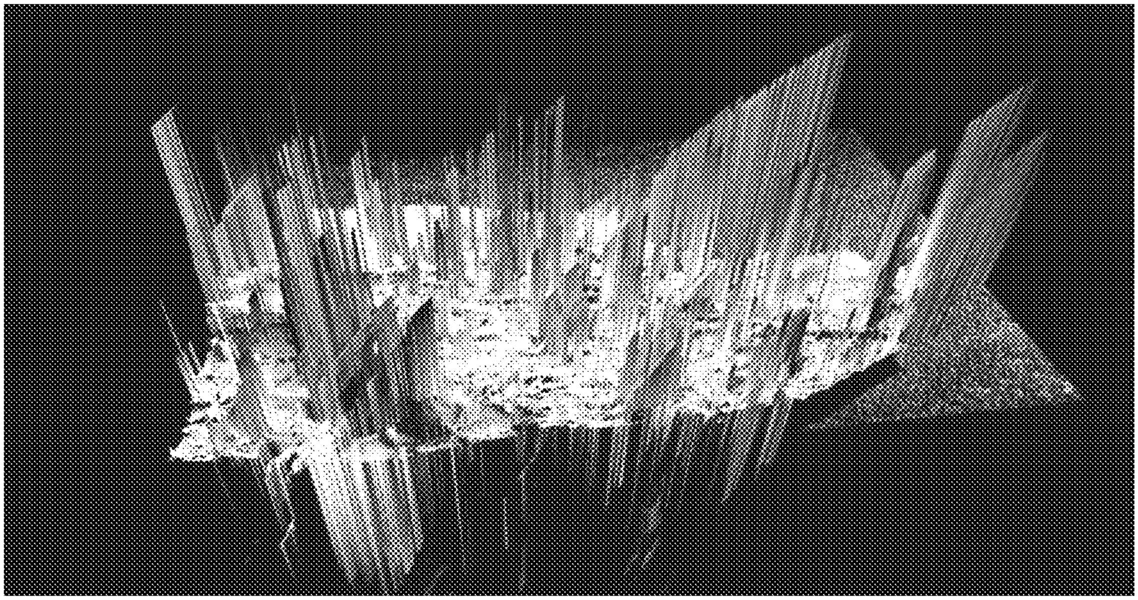
FIGS. 6A-B are images illustrating the result from 3D imaging of a highly specular reflective metal foil based on light triangulation using a prior art imaging system vs. using an imaging system based on embodiments herein.
Figure 6B:
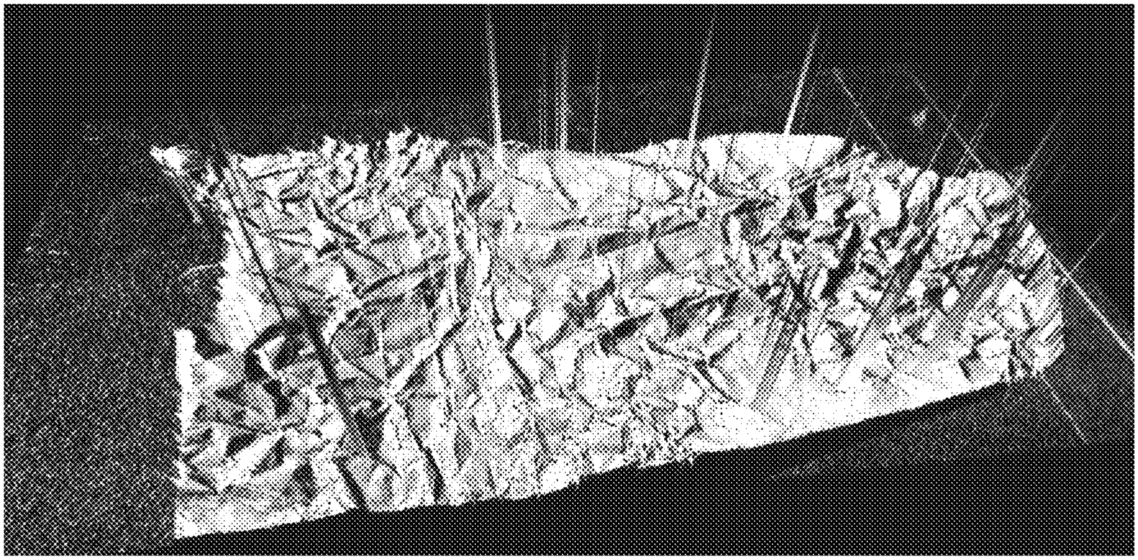

FIGS. 6A-B are images illustrating the result from 3D imaging of a highly specular reflective metal foil based on light triangulation using a prior art imaging system vs. using the same system but with an light shield for stray light as in embodiments herein. More particularly, the shown images are resulting from such imaging system 500 as in FIGS. 5A-C without and with a light shield as the light shield 500. The object being imaged is one and the same in the two images and corresponds to a type of object that normally is very difficult to 3D image based on light triangulation, a highly reflective metal foil provided with a random height profile with a lot of height differences. In the implementation the illumination comprising the structured light, corresponding to the structured light 511, was provided by a laser as light source, corresponding to the light source 510 with the structured light corresponding to a laser plane. A distance corresponding to the smallest distance 552 between light shield parts was 0.9 mm and arranged so that the light shield was not closer to the structured light than 5% of the maximum intensity of the illumination by the laser at this location of the light shield. The structured light, thus here laser plane, was centered in the gap formed by the 0.9 mm distance. The two light shield parts, corresponding to the light shield parts 550*a,b,* had a respective smallest distance, corresponding to respective distance 552*a,b,* between respective light shield part and the structured light that thus was less than half the 0.9 mm distance, that is, less than 0.45 mm. Although the light shield was not fine-tuned in any way for the application, since the implementation and tests were more of "proof of concept", it can clearly be seen improvements in the 3D image based on imaging with present of the light shield. A lot of the "spikes", corresponding to distortions, in the image do not occur when the light shield is present. As indicated in the introduction above, "spikes" of this kind is typically caused by unwanted intensity peaks, for example as in this case intensity peaks caused by specular reflections of stray light. Their presence in a 3D image as in the figures is often due to that "post image sensing" processing have had problems of discriminating between wanted intensity peaks and unwanted ones and therefore sometimes selects unwanted ones instead of the actually wanted intensity peaks, where wanted ones are intensity peaks caused by direct reflections on the object by the structured light.

Figure 7:
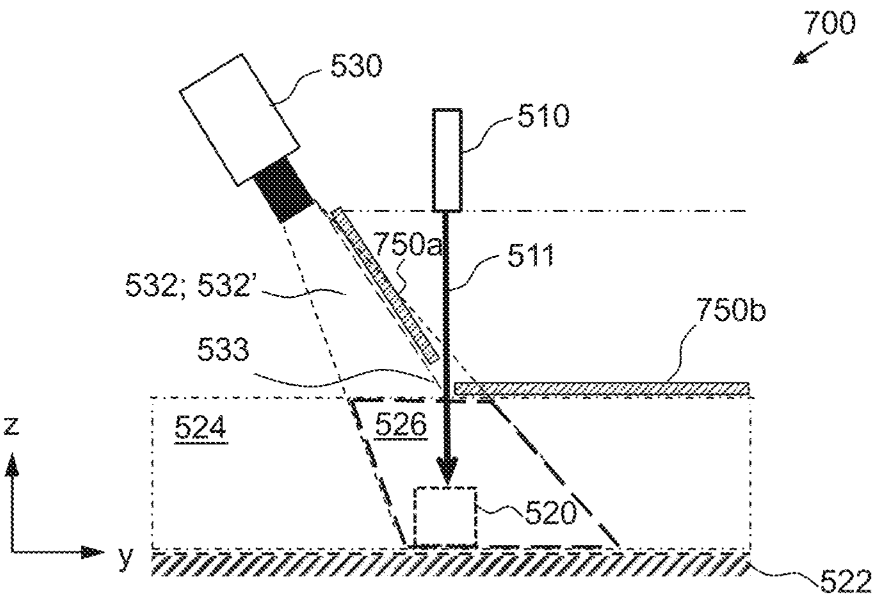
FIG. 7 schematically illustrates an imaging system according to embodiments herein with a second example of a light shield.

FIG. 7 schematically illustrates an imaging system 700 according to embodiments herein with a second example of a light shield, namely a light shield 750. Except from a different light shield, the rest of the imaging system 700 is the same as the imaging system 500 in FIGS. 5A-C. This to facilitate comparison. However, as realized by the skilled person, a light shield as in embodiments herein is of course compatible with and can be used in an 3D imaging system based on light triangulation in general and not only exactly such as schematically illustrated in the examples herein. Focus in the following will thus be on the light shield 750 in the imaging system 700 and what differs compared to the light shield 550 in the imaging system 500. What is not discussed may be assumed to be the same or similar as discussed above in connection with FIGS. 5A-C.

The imaging system 700 is shown in a side view similar as the one in FIG. 5A. The side view correspond to a cross section of the light shield 750. Although there is not shown a corresponding top view as in FIG. 5B, the light shield 750 can be assumed to extend in similar way across the lateral extension of the virtual volume 524, that is, in the y-direction in the example coordinates as used herein. Note that a light shield as in embodiments herein need not to extend over the whole lateral extent of the virtual volume, although this typically is preferred, and may in some embodiments only extend partially over the lateral extent of the virtual volume.

Also the light shield 750 extends and is present between the light source 510 and the virtual volume 524 and comprises a first light shield part 750*a* arranged on a first side of the structured light 511 in direction of the camera 530 and a second light shield part 750*b* arranged on a second side of the structured light 511 in opposite direction of the camera 530. Note that there need not be a light shield part on both sides of the structured light in all embodiments, although this typically is preferred.

The first light shield part 750*a,* and thus the light shield 750 as well, also here extends between the light source 511 and the virtual volume 524 with a distance to the structured light 511 that decreases in the direction of the virtual volume 524.

A light shield in embodiments herein may thus have tapered or funnel like extension towards the virtual volume, for example the virtual volume, where the smallest distance to the structured light may be towards and may be the part of the light shield that is closest to the virtual volume.

It is realized from the figure that also the light shield 750 has an effect of shielding stray light, that is, at least some stay light, from the light source 510 and that else would reach the sub-volume 526.

As can be seen in the shown example, both light shield parts 750*a,b* are arranged very close to the virtual volume and may follow its upper border, except where this is not possible in order not to obscure the field of view 533 covering the structured light 511 in the virtual volume 524, which is why the first light shield part 750*a* follows the virtual line 533 in the figure.

An alternative light shield to the light shield 750 in FIG. 7 is a light shield that is arranged very close to the light source instead, for example corresponding to that the second light shield part 750*b* would be translated upwards in the figure to the line shown in level with the light source 510. In such embodiments there may be a first light shield part that is similar as the second light shield part but on the other side of the structured light 511 and thus not with a tilt as the first light shield part 750*a,* for example on the same level and parallel with the second light shield part, extending from outside the structured light 511 towards where the virtual line 533 at the camera 530 merges with upper limit of the field of view 532.

Figure 8:
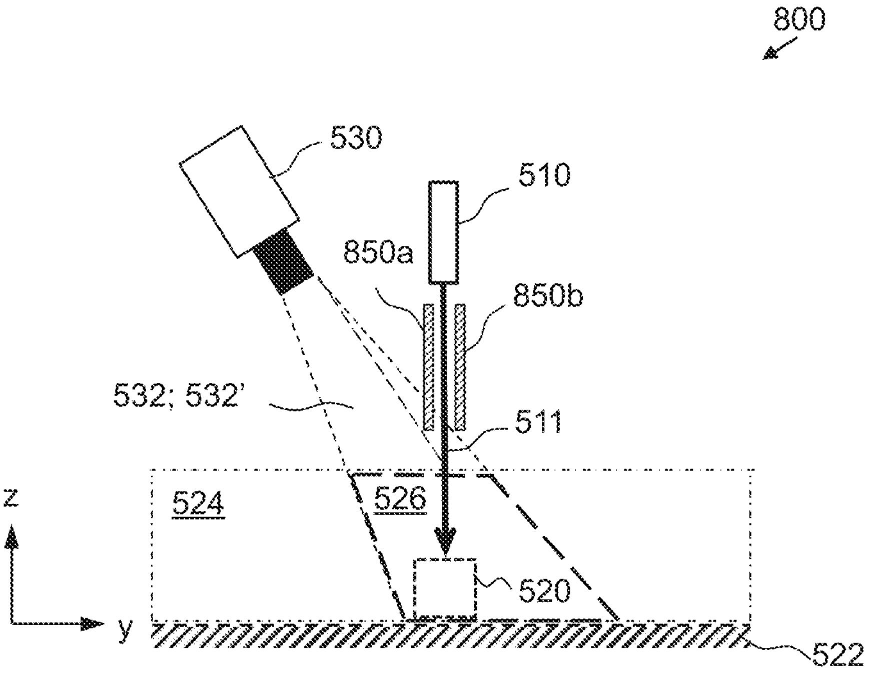
FIG. 8 schematically illustrates an imaging system according to embodiments herein with a third example of a light shield.

FIG. 8 schematically illustrates an imaging system 800 according to embodiments herein with a third example of a light shield, namely a light shield 850. Except from a different light shield, the rest of the imaging system 800 is the same as the imaging system 500 in FIGS. 5A-C or the imaging system 700 in FIG. 7. This to facilitate comparison. Focus in the following will thus be on the light shield 850 in the imaging system 800 and what differs compared to the light shields 550, 750. What is not discussed may when possible be assumed to be the same or similar as discussed above for said imaging systems 500, 700 and light shields 550, 750.

The imaging system 800 is shown in a side view similar as the one in FIG. 5A FIG. 7. The side view correspond to a cross section of the light shield 850. Although there is not shown a corresponding top view as in FIG. 5B, the light shield 850 can be assumed to extend in similar way across the lateral extension of the virtual volume 524, that is, in the y-direction in the example coordinates as used herein.

Also the light shield 850 extends and is present between the light source 510 and the virtual volume 524 and comprises a first light shield part 850*a* arranged on a first side of the structured light 511 in direction of the camera 530 and a second light shield part 850*b* arranged on a second side of the structured light 511 in opposite direction of the camera 530. It is realized from the figure that also the light shield 850 has an effect of shielding stray light, that is, at least some stay light, from the light source 510 and that else would reach the sub-volume 526.

The light shield 850 is example of an alternative slight shield that works but that is expected to be less effective and/or less advantageous than the light shields 550, 750 due to that the latter have light shielding major surfaces that extend orthogonally to the illumination direction of the structured light 511. This is not the case for the light shield 850 since its major light shielding surfaces only extend vertically, that is, parallel with the illumination direction of the structured light 511. Light shielding major surfaces that extend orthogonally to the illumination direction of the structured light 511 are beneficial for efficient light shielding and coverage of the virtual volume and at the same time enables the light shield to be arranged with a distance from the light source and close to the virtual volume while still providing good shielding of the virtual volume. This also facilitates that a light shield can be arranged at a distance from the light source and still be efficient.

Above it has not been shown or discussed how the light shields in embodiments herein may be supported and/or mounted in and/or in relation to its imaging system and other units thereof. Respective light shield may be attached and/or mounted to the light source, the object support structure or some other suitable stable part in or nearby the imaging system. A frame or similar structure may be used for arranging, such as holding, the light shield in a desirable and preferably fix position during the imaging and scanning of objects. For an imaging system that has been set up for a particular application for 3D scanning of objects, a light shield may be adapted to the setup to accomplish shielding of stray light as described herein and the light shield may thereafter remain so, for example in one and the same fixed position, in the imaging system as long as nothing affecting the light shield is changed. However, as realized from this and the above discussion regarding distances and placement of the light shield and light shield parts in relation to the structured light etc., location and placement of the light shield and parts thereof may need to be (re)adapted for each specific application and significant changes to the rest of imaging system.

In view of the above it may be preferred to setup and/or adjust the light shield for the imaging system at setup of the imaging system, after it has been set up regarding the light triangulation as such, or use a fix light shield configured for the light source being used and associated with a certain light triangulation use, for example so that the light shield is so close to the light plane as possible without visually interfering, or risking to visually interfere during operation, with the structured light.

Further, it may therefore be advantageous with an adjustable light shield, for example light shield parts thereof, for example a light shield arrangement comprising adjustment means operating on the light shield as such. This enables and/or facilitates using one and the same light shield arrangement in differently setup imaging systems to accomplishing a light shield adapted for a specific imaging system setup and application. The setup of imaging system as such may be as conventionally.

It may thus be beneficial with a light shield that is adjustable and in case of two light shield parts they may be independently adjustable. The adjustment(s) may be performed manually and/or mechanically and/or by some electrically controlled adjustment means or arrangement during setup of the imaging system. The adjustment is preferably at least in the orthogonal direction to the structured light so that said distance to/from the structured light can be adjusted. Moreover, it may be advantageous if the light shield and/or respective light shield part is adjustable in direction to/from the virtual volume, for example up/down between the virtual volume and the light source. It may also be advantageous if the extension of the light shield and/or light shield parts that affects how the light shield covers the virtual volume and is able to shield stray light, can be adjusted as well, for example to be able to adapt to and cover the virtual volume in a desirable way. Further, in case of a light shield or light shield part with a tilt, for example to accomplish a decreasing distance to the structured towards the virtual volume, the tilt angle is preferably also adjustable. This may be particularly advantageous for the first light shield part facing the camera, since it then can be adjusted in view of the virtual volume and the field of view of the camera.

Figure 9:
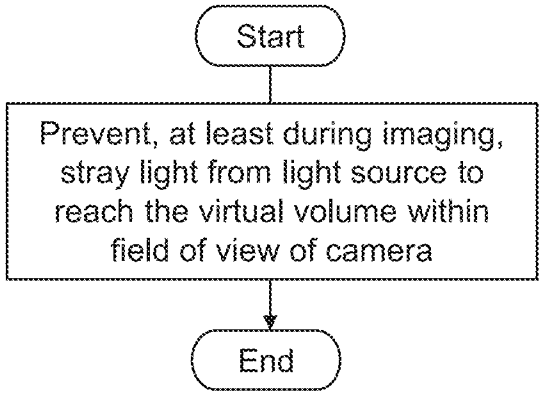
FIG. 9 is a flowchart for schematically illustrating embodiments of a method according to embodiments herein.

FIG. 9 is a flowchart for schematically illustrating embodiments of a method according to embodiments herein. The method is for supporting reduction of distortions, such as said "spikes", in three dimensional imaging based on light triangulation, particularly when one or more object to be imaged comprise of or more highly-reflective surfaces, such as mirror-like, that cause specular reflections. Said three dimensional imaging is performed by an imaging system, for example any one of the imaging systems 500, 700, 800. Also the method may be performed by this imaging system. Hence, the imaging system comprises a camera, for example the camera 530, and a light source, for example the light source 510, for providing illumination of an object, for example the object 520, to be imaged. The illumination comprises structured light, for example the structured light 511, used in the light triangulation. The camera being arranged in relation to the provided structured light so that the camera during imaging captures reflected structured light from the object in an image as part of said light triangulation, whereby, according to the light triangulation, positions of captured reflected structured light in the image map to real world positions where the structured light was reflected by the object. The structured light intersecting a virtual volume, for example the virtual volume 524, comprising the object and that corresponds to a volume where one or more objects, including said object, that the imaging system is configured to image are present during the imaging.

The method comprises the following action.

Action 901

Stray light, such as the stray light 415, of the illumination from the light source is, at least during said imaging by the camera, prevented to reach said virtual volume within field of view of the camera, for example to reach the virtual volume 524 within the field of view 532.

The prevention is preferably done by shielding the stray light and the shielding may be performed by a light shield, for example such light shield as discussed above, such as any one of the light shields 550, 750, 850.

Note that any enumerating terminology such as first device, second device, first surface, second surface, etc., should as such be considered non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically but not necessarily drawn using dotted or dashed lines.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. An imaging system for three dimensional imaging of an object based on light triangulation, comprising a camera and a light source configured to provide an illumination of the object comprising structured light, the camera being arranged in relation to the provided structured light so that the camera is able to capture reflected structured light from the object in an image as part of said light triangulation whereby, according to the light triangulation, positions of captured reflected structured light in the image map to real world positions where the structured light was reflected by the object, the structured light intersecting a virtual volume comprising the object—and that corresponds to a volume where one or more objects, including said object, that the imaging system is configured to image are present during the imaging, wherein the imaging system further comprises a light shield arranged outside the structured light between the light source and said virtual volume such that the light shield shields stray light from the light source and thereby prevents it from reaching the virtual volume within field of view of the camera, and wherein the light shield is arranged outside the structured light with distance to the structured light such that the light shield thereby avoids shielding light of the illumination closer to the structured light than where the illumination has decreased to 5% of its maximum intensity.

2. The imaging system as claimed in claim 1, wherein the light shield has one or more light shielding major surfaces that have extension in one or more directions orthogonal to an illumination direction of the structured light.

3. The imaging system as claimed in claim 1, wherein the light shield extends outside the structured light between the light source and the virtual volume with a distance to the structured light that decreases in direction of the virtual volume.

4. The imaging system as claimed in claim 1, wherein the light shield comprises:

a first light shield part arranged on a first side of the structured light in direction of the camera; and/or a second light shield part arranged on a second side of the structured light in opposite direction of the camera.

5. The imaging system as claimed in claim 4, wherein the first light shield part is arranged outside at least a part of field of view of the camera that is covering the structured light in the virtual volume.

6. The imaging system as claimed in claim 1, wherein the light shield is closest to the structured light where the light shield is closest to the virtual volume and/or where the light shield is closest to where the illumination has a focus point.

7. A method for supporting reduction of distortions in three dimensional imaging based on light triangulation, said three dimensional imaging being performed by an imaging system comprising a camera and a light source for providing illumination of an object to be imaged, wherein the illumination comprises structured light used in the light triangulation, the camera being arranged in relation to the provided structured light so that the camera during imaging captures reflected structured light from the object in an image as part of said light triangulation whereby, according to the light triangulation, positions of captured reflected structured light in the image map to real world positions where the structured light was reflected by the object, the structured light intersecting a virtual volume comprising the object and that corresponds to a volume where one or more objects, including said object, that the imaging system is configured to image are present during the imaging, wherein the method comprises: at least during said imaging by the camera, preventing stray light from the light source to reach the virtual volume within field of view of the camera, wherein said preventing stray light is accomplished by shielding the stray light by a light shield arranged outside the structured light between the light source and said virtual volume with:

distance to the structured light such that the light shield thereby avoids shielding light of the illumination closer to the structured light than where the illumination has decreased to 5% of its maximum intensity; or distance to the structured light but so close that the light shield at least shields light of the illumination where the illumination has decreased to 1% of its maximum intensity.

8. An imaging system for three dimensional imaging of an object based on light triangulation, comprising a camera and a light source configured to provide an illumination of the object comprising structured light, the camera being arranged in relation to the provided structured light so that the camera is able to capture reflected structured light from the object in an image as part of said light triangulation whereby, according to the light triangulation, positions of captured reflected structured light in the image map to real world positions where the structured light was reflected by the object, the structured light intersecting a virtual volume comprising the object—and that corresponds to a volume where one or more objects, including said object, that the imaging system is configured to image are present during the imaging, wherein the imaging system further comprises a light shield arranged outside the structured light between the light source and said virtual volume such that the light shield shields stray light from the light source and thereby prevents it from reaching the virtual volume within field of view of the camera, and wherein the light shield is arranged outside the structured light with distance to the structured light but so close that the light shield at least shields light of the illumination where the illumination has decreased to 1% of its maximum intensity.

9. The imaging system as claimed in claim 8, wherein the light shield has one or more light shielding major surfaces that have extension in one or more directions orthogonal to an illumination direction of the structured light.

10. The imaging system as claimed in claim 8, wherein the light shield extends outside the structured light between the light source and the virtual volume with a distance to the structured light that decreases in direction of the virtual volume.

11. The imaging system as claimed in claim 8, wherein the light shield comprises:

a first light shield part arranged on a first side of the structured light in direction of the camera; and/or a second light shield part arranged on a second side of the structured light in opposite direction of the camera.

12. The imaging system as claimed in claim 11, wherein the first light shield part is arranged outside at least a part of field of view of the camera that is covering the structured light in the virtual volume.

13. The imaging system as claimed in claim 8, wherein the light shield is closest to the structured light where the light shield is closest to the virtual volume and/or where the light shield is closest to where the illumination has a focus point.

* * * * *